UNITED STATES PATENT OFFICE.

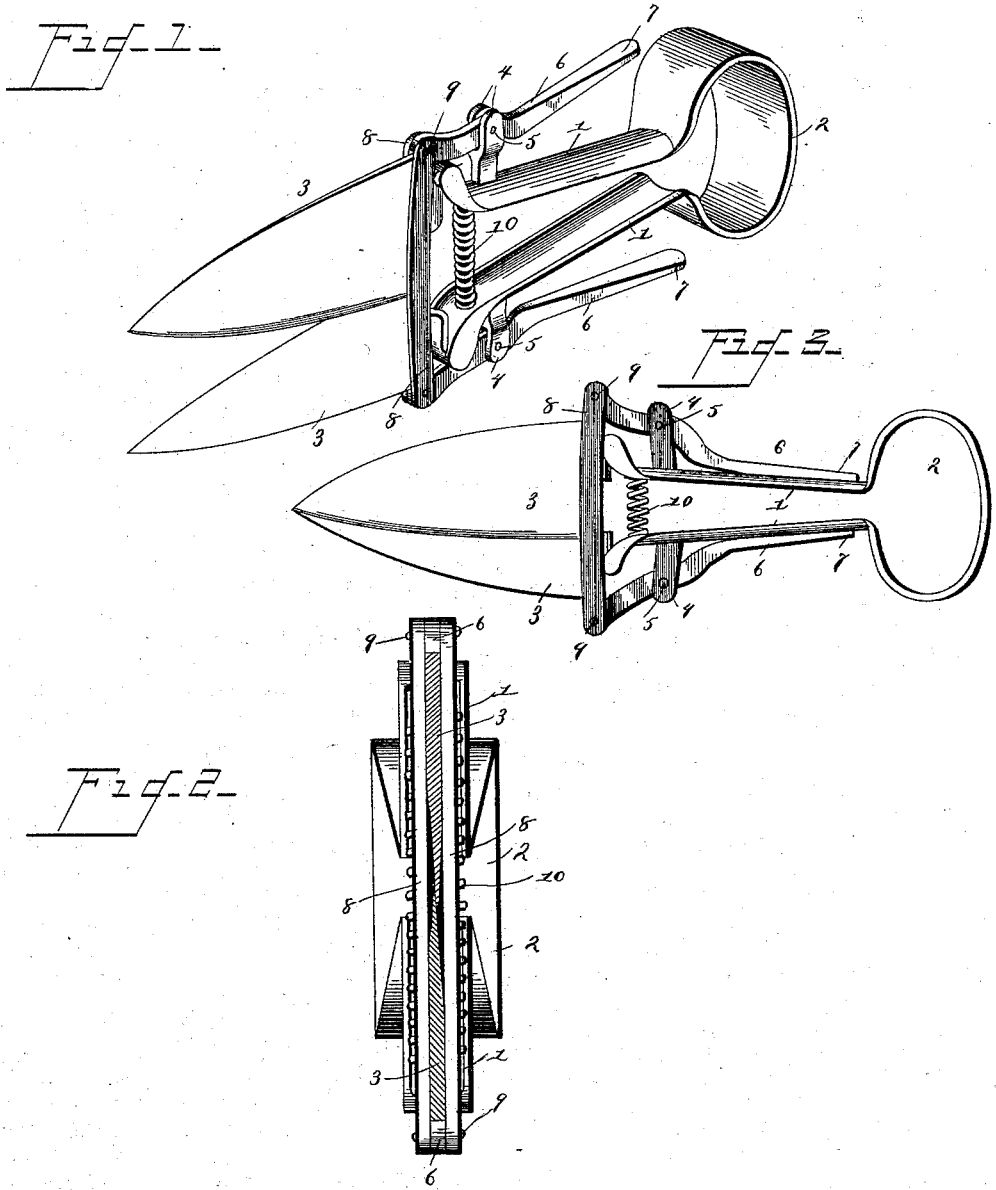

ELWIN F. WATSON AND MARTIN L. TOLBERT, OF FORT SHAW, MONTANA.

SHEARS.

SPECIFICATION forming part of Letters Patent No. 423,008, dated March 11, 1890.

Application filed November 19, 1889. Serial No. 330,839. (No model.)

*To all whom it may concern:*

Be it known that we, ELWIN F. WATSON and MARTIN L. TOLBERT, citizens of the United States, residing at Fort Shaw, in the county of Cascade and Territory of Montana, have invented a new and useful Shears, of which the following is a specification.

This invention has relation to an improvement in shears, and especially to sheep-shears; and among the objects in view are to enable the operator to operate the blades with more ease, to prevent the shears from bucking, and to make the shears more accurate or quicker in their action.

With these general objects in view the invention consists in certain features of construction hereinafter specified, and particularly pointed out in the claims.

Referring to the drawings, Figure 1 is a perspective of a pair of sheep-shears provided with our improvement. Fig. 2 is a transverse section. Fig. 3 is a side elevation showing the shears closed.

Like numerals indicate like parts on all the figures of the drawings.

1 1 represent the usual shanks, bent intermediate their ends to form the jaw-opening spring 2, and projected beyond their shanks to form the blades 3. The shanks 1 are provided near their forward ends with outwardly-projecting forked bearing ears or lugs 4, and pivotally mounted within the forks of the same by rivets 5 are opposite hand-levers 6, the rear ends of which are extended to form grips 7, and the forward ends terminate in front of the ends of the shanks 1 and at the heels of the blades 3. The blades are embraced at each side by links 8, and the opposite ends of the links are pivoted, as at 9, to the ends of the levers.

10 represents a coiled spring located between the forward ends of the shanks 1, and serving not only to aid the spring 2 in maintaining the blades in an open position, but to greatly accelerate their action. The links 8 are at such relative distance apart as to maintain the blades in close relation to each other and prevent a lateral spreading of the same, or what is commonly known to sheep-shearers as "bucking."

The operation of our invention will be readily understood and appreciated from the foregoing description, in that to operate the shears it is simply necessary to grasp the opposite levers at their grips 7, and intermittently operate the same in the same manner as is customary to operate the shears heretofore constructed.

Aside from the advantages specified by the use of our improved mechanism, it may be stated that the levers greatly reduce the power required to operate the blades, thus quickening the operation, and by the use of the supplemental spring the return movement of the shears is, as before stated, greatly accelerated.

Having described our invention, we claim—

1. The combination, with opposite shear-shanks, each provided with a bearing-ear projecting outwardly therefrom, of opposite levers pivotally mounted thereon and extended in rear of their pivots to form hand-grips or handles, and a link pivotally connecting the levers at their forward ends and in front of their pivots, substantially as specified.

2. The combination, with the opposite shanks provided with opposite bearing-ears, of oppositely-pivoted operating-levers extended in rear of their pivots to form hand-grips, and opposite links pivoted at their ends to the forward ends of the levers and embracing the opposite shear-blades and serving to maintain them in contact with each other, substantially as specified.

3. The combination, with the shanks 1, the intermediate rear spring 2, and the blades 3, of the coiled spring mounted between the shanks at the heels of the blades, the perforated bearing-ears mounted on the shanks at their forward ends and in rear of the supplemental spring, the operating-levers pivoted in the ears and extended at each side of their pivot-point, and the opposite links embracing the blades and pivoted at their ends to those of the levers, substantially as specified.

In testimony that we claim the foregoing as our own we have hereto affixed our signatures in presence of two witnesses.

ELWIN F. WATSON.
MARTIN L. TOLBERT.

Witnesses:
J. MYERS,
ALFRED ROBSON.